United States Patent [19]

Edler

[11] 4,194,997

[45] Mar. 25, 1980

[54] SULFITE SPENT LIQUOR-UREA FORMALDEHYDE RESIN ADHESIVE PRODUCT

[76] Inventor: Folke J. Edler, Södra Fiskebäcksvägen 202, 421 58 Västra Frölunde, Gothenburg, Sweden

[21] Appl. No.: 899,237

[22] Filed: Apr. 24, 1978

Related U.S. Application Data

[63] Continuation-in-part of Ser. No. 738,370, Nov. 3, 1976, abandoned, which is a continuation of Ser. No. 574,515, May 5, 1975, abandoned.

[51] Int. Cl.² ............................................. C08L 97/00
[52] U.S. Cl. .............................. 260/17.5; 106/123 R; 260/29.4 R; 264/109
[58] Field of Search .................... 260/17.5, 29.4 R; 106/123 R; 264/109

[56] References Cited

U.S. PATENT DOCUMENTS

| | | | |
|---|---|---|---|
| 2,405,650 | 8/1946 | Hartwig et al. | 260/17.5 |
| 2,622,979 | 12/1952 | Keim | 260/17.5 |
| 3,313,745 | 4/1967 | Klug | 260/17.5 |
| 3,395,033 | 7/1968 | Remer | 260/12.4 |
| 3,990,928 | 11/1976 | Schmidt-Hellerau | 260/17.5 |
| 3,994,850 | 11/1976 | Willegger et al. | 260/17.5 |

*Primary Examiner*—Lorenzo B. Hayes
*Attorney, Agent, or Firm*—Eugene D. Farley

[57] ABSTRACT

An adhesive product particularly suitable for use in the manufacture of wood particle board comprises from 50-90 parts by weight urea formaldehyde resin and from 10-50 parts by weight spent liquor from the acid sulfite pulping of lignocellulose, the adhesive product containing from 0.2 to 4.0% by weight ammonium ion (expressed as $NH_3$) based on the spent liquor solids. The sulfite spent liquor component of the mixture prior to mixing has a pH of from 3-9; the urea formaldehye resin prior to mixing, a pH of from 6 to 8. The urea formaldehye resin is further characterized by a molar ratio of formaldehyde to urea of from 1.0 to 1.8, and a methylol content corresponding to a Witte number of from 1.0 to 1.8.

Glued wood products such as wood particle board are made using the herein described adhesive by applying to the surfaces of wood particles a bonding quantity of the foregoing adhesive, assembling the adhesive-coated pieces, and hot pressing the resulting assembly to cure the adhesive and bond the pieces together.

20 Claims, No Drawings

SULFITE SPENT LIQUOR-UREA FORMALDEHYDE RESIN ADHESIVE PRODUCT

BACKGROUND AND SUMMARY OF THE INVENTION

This application is a continuation-in-part of the patent application of Folke J. Edler, Ser. No. 738,370, filed Nov. 3, 1976, the same being a continuation of Ser. No. 574,515, filed May 5, 1975, both for METHOD OF MANUFACTURE OF ADHESIVE PRODUCTS and now abandoned.

The present invention relates to a method of manufacture of adhesive products including urea based condensation products with formaldehyde and with the addition of acid sulfite spent liquor. More particularly the invention relates to the manufacture of such adhesive products as are generally used in connection with dry process wood particle board and similar products, and of which adhesive products sulfite spent liquor is a large constituent.

Others heretofore have investigated the possibility of combining various synthetic resins, including urea formaldehyde resins, or the components thereof, with various sulfite spent liquors. Among these are Hartwig et al U.S. Pat. Nos. 2,405,650 (cores for metal castings), Keim 2,622,979 (wet strength paper), Walther et al 3,313,745 (foamed bodies).

Schmidt-Hellerau U.S. Pat. No. 3,390,920 discloses the use of urea formaldehyde resin and a very minor proportion (1-5%) of sodium ligninsulfonate in wood particle board production. Willegger et al U.S. Pat. No. 3,994,850 discloses the manufacture of wood particle board using an adhesive prepared by reacting together urea, sodium base spent sulfite liquor and formaldehyde.

However, none of the procedures of the foregoing references have solved successfully the problem of incorporating a large proportion of sulfite spent liquor in wood particle board adhesives. It has become axiomatic in the industry that the use of substantial quantities of these materials in the manufacture of such adhesives is to be avoided for reasons of incompatibility with the resin constituents of the adhesives and unacceptable properties of the particle board manufactured using the adhesives.

This belief is based on the results of extensive experimental experiences and is fully justified by the molecular complexity of the two reactants, i.e. the sulfite spent liquor and the urea formaldehyde resin, as well as by the diversity of chemical reactions which potentially can occur during the preparation of the resin, the mixing of the resin with the sulfite spent liquor, and the subsequent hot pressing operation.

Thus, the sulfite spent liquors are incompatible with and insoluble in, certain of the urea resins.

Under certain conditions urea and formaldehyde combine to form resinous condensation products containing a high proportion of mono-di-and polymethylol ureas, i.e. "methylol rich" products. Under other conditions the urea and formaldehyde combine to form a high proportion of methylene ureas, i.e. "methylene rich" products. The methylol rich products are compatible with sulfite spent liquors whereas the methylene rich products are not. Accordingly, if the urea formaldehyde resin is to be combined successfully with sulfite spent liquor, it must be of the methylol rich type.

Second, when the urea formaldehyde resin is mixed with substantial quantities of an untreated ammonium base sulfite spent liquor which contains ammonia in the form of ammonium lignin sulfonate, the ammonia quickly removes any free and loosely bound formaldehyde present in, or supplied by, the urea formaldehyde resin, converting it to the relatively inactive product hexamethylene tetramine. This reaction liberates excess lignin sulfonic acids which lower the pH of the adhesive mixture, over-catalyzes the adhesive and results in excessively rapid cure and premature gelation. Conversely, when the resin is mixed with calcium, magnesium or sodium base sulfite spent liquor, no ammonia at all is present, the above noted liberation of lignin sulfonic acids does not occur and the adhesive will be under-catalyzed.

Accordingly, it is important that the ammonia content of the adhesive be carefully controlled.

Third, variations in the pH of both the adhesive product and its components can affect materially the activity and properties of the adhesive. Too high a pH causes the adhesive to cure too slowly. Too low a pH causes it to cure too fast. Still further, in the hot press excess acidity may degrade the cellulose content of the wood to which it is applied. For these reasons it is necessary to control carefully the pH of both the sulfite spent liquor and urea formaldehyde resin components of the desired adhesive product.

It is the general object of the present invention to provide an adhesive product suitable for use in the manufacture of wood particle board which product includes a large proportion of the spent liquor from the sulfite pulping of lignocellulose, is easily and simply manufactured, is readily applicable to the manufacture of particle board using conventional apparatus and methods, and leads to the production of glued wood products of commercially acceptable properties, which meet the commercial standards for such products, and are fully competitive with related products manufactured using conventional, more expensive, adhesives.

It is another object of the invention to provide a process for making such adhesives.

Still another object of the invention is the provision of a novel glued wood product such as wood particle board manufactured with the hereindescribed adhesive, and a method of manufacture of such a product.

Yet another important object of the invention is the provision of an adhesive product the manufacture of which utilizes in large proportion a very low cost waste product, sulfite spent liquor, and thereby at the same time assists in the classic problem attending the disposition of pulp mill sulfite spent liquor while providing economies in the cost of a particle board adhesive, which in the case of the average particle board plant may be of the order of one-half million dollars annually.

I have discovered that the problems attending the combination of urea formaldehyde resins and sulfite spent liquors in the manufacture of a useful adhesive product may be overcome, and the foregoing objects achieved, by the provision of an adhesive product broadly comprising 50 to 90 parts by weight of urea formaldehyde resin solids and from 10–50 parts by weight of the spent liquor resulting from the acid sulfite pulping of lignocellulose, dry solids basis. The adhesive product also contains as a key component from 0.2 to 4.0% by weight of ammonium ion (expressed as $NH_3$) on a sulfite spent liquor solids basis. The ammonium ion may be supplied by the utilization of ammonium base sulfite spent liquor of adjusted ammonium ion content.

In the event that it is desired to use another sulfite spent liquor, i.e. a calcium base, magnesium base, or sodium base sulfite spent liquor, the ammonium ion is provided by the addition of a water soluble, ammonium salt of a strong acid in appropriate amount.

The ammonium salt has the effect of providing ammonia which combines with free formaldehyde which is present in the mixture to form the neutral product hexamethylene tetramine, releasing a strong acid, and leaving a mixture of increased but controlled acidity which promotes the desired condensation or polymerization of the adhesive product during its use, as set forth hereinabove.

The urea formaldehyde resin component of the adhesive product is characterized by a molar ratio of formaldehyde to urea of from 1.0 to 1.8, and a methylol content corresponding to a Witte number of from 1.0 to 1.8. The properties of the resin thus are such as to insure compatibility with, and a desired degree of solubility in, the sulfite spent liquor as required to provide a suitable adhesive product.

The adhesive product is manufactured by simply intermixing the sulfite spent liquor and the urea formaldehyde resin in the presence of ammonium ion under conditions of temperature, pH and viscosity which lead to the production of a mixture in which the lignin sulfonic acid component of the sulfite spent liquor and the urea formaldehyde resin do not rapidly condense with each other to a substantial degree. The product thus is to be distinguished from the prior art products wherein such rapid condensation occurs or is deliberately promoted. It also is to be distinguished from the prior art processes wherein the sulfite spent liquor is reacted with urea and formaldehyde in a ternary mixture of these components.

In an application of the adhesive product of the invention to the manufacture of glued products such as wood particle board, the adhesive is simply applied to the wood base in the usual amounts and proportions, and hot pressed, using conventional apparatus, to form the final glued, consolidated wood product.

DESCRIPTION OF PREFERRED EMBODIMENTS OF THE INVENTION

As noted above, the presently described adhesive product broadly comprises, in substantially uncondensed admixture with each other, in parts by weight, on a dry solids basis:

Urea Formaldehyde Resin: 50–90.

Spent Liquor from the Acid Sulfite Pulping of Lignocellulose: 10–50.

The adhesive product contains also from 0.2 to 4.0% by weight of ammonium ion (expressed as NH$_3$), on a spent liquor solids basis.

As also noted above, the urea formaldehyde resin is characterized by carefully controlled properties, particularly by its mol ratio of formaldehyde to urea of from 1.0 to 1.8 by which is meant from 1.0 to 1.8 mols of formaldehyde per mol of urea; its pH of from 6 to 8; and by its methylol content corresponding to a Witte number of from 1.0 to 1.8. Additionally, it should have a solids content of from 50 to 72%, preferably 55 to 65% by weight, and a viscosity of from 50 to 250 centipoises at 65% resin solids and 25° Centigrade.

With respect to the mol ratio, it is to be observed that if the mol ratio is below 1, the urea formaldehyde polymer is not sufficiently functional to develop the desired adhesive properties in the final product. At a mol ratio above 1.8, excessive quantities of formaldehyde are present. This leads to the formation of an adhesive product having an objectionable odor and one which liberates excessive toxic fumes in the hot press and thereafter in service.

With respect to the viscosity limit of 50 to 250 centipoises, it is to be observed that this range is below the viscosity range of the urea formaldehyde resins conventionally used in the manufacture of particle board. If the urea formaldehyde resin were to be used per se at such a viscosity, it would be unsatisfactory because of its poor tack properties. The addition of the sulfite spent liquor, as taught herein, is required in order to develop the required tack properties.

With respect to the methylol content of the urea resin, a methylol content corresponding to a Witte number of 1.0 to 1.8 is required in order to make the urea formaldehyde resin compatible with the sulfite spent liquor and in order to develop satisfactory adhesion and product performance.

The term Witte number is obtained as a result of a determination of the methylol groups in urea formaldehyde resins by reacting the resins with 2,6-dimethyl phenol (2,6-xylenol). It measures the methylol functionality of the resin. It is determined as follows.

A solution of 2,6-dimethyl phenol (25.0 g) in 200 ml. of water containing 8.0 g sodium hydroxide is treated with 12.5 g of the urea formaldehyde resin to be tested, with thorough mixing. The resulting reaction mixture is allowed to stand at room temperature in the dark for three days. Concentrated hydrochloric acid is added until the pH of the reaction mixture reaches 5.5–6.0. The reaction mixture is washed into a one liter flask and steam distilled until 700–750 ml. of distillate has been collected.

The condenser is rinsed with a little methylene chloride and the condensate extracted with 3×100 ml. of methylene chloride. The combined methylene chloride extracts are filtered through ca. 20 g sodium sulfate (anhydrous) and the sodium sulfate washed with 2×25 ml. methylene chloride.

The methylene chloride is evaporated in vacuo until constant weight of the evaporating flask is obtained. The weight of the residual 2,6-dimethyl phenol is determined and subtracted from its original weight. The difference of these two weights is the amount of 2,6-dimethyl phenol which has reacted with the urea formaldehyde resin and is a measure of the methylol content of the resin. It is termed herein the "Witte number". This value is calculated by the following equation:

$$\frac{\text{Weight of Reacted Xylenol}}{12.5 \times \% \text{Solids of } UF \text{ Resin}} = \text{Witte Number}$$

It bears a direct relationship to the methylol content of the resin, as shown by the following tabulation of typical test results in which the Witte numbers were determined for a series of urea formaldehyde resins of varying mol ratios (mols formaldehyde per mol of urea) prepared in such a manner that methylol functionality was maximized.

| Mol Ratio of Urea Formaldehyde Resin | Witte Number |
| --- | --- |
| 0.9 | 0.76 |
| 1.2 | 1.17 |
| 1.3 | 1.30 |
| 1.4 | 1.38 |
| 1.5 | 1.47 |

-continued

| Mol Ratio of Urea Formaldehyde Resin | Witte Number |
|---|---|
| 1.6 | 1.57 |
| 100% dimethylol urea | 2.64 |

With respect to the sulfite spent liquor component of the adhesive product of the invention:

By the term "sulfite spent liquor" is meant the liquor resulting from the conventional acid sulfite pulping procedure in which there is about 5 to 7% by weight total sulfur dioxide and 0.9 to 1.2% combined sulfur dioxide.

The sulfite spent liquor results from any of the conventional acid sulfite lignocellulose pulping procedures. It accordingly may comprise any of the commonly produced acid sulfite spent liquors, whether ammonium base, calcium base, magnesium base or sodium base.

Specifically excluded, however, are the sulfite spent liquors resulting from the pulping of lignocellulose by the "Magnafite", "Sodafite" and neutral sulfite semi-chemical ("NSSC") processes. These three spent liquors are inoperable for the purposes of the invention and are excluded by definition from the description thereof because all of them contain substantial quantities of residual sulfite ion in their concentrated liquors. As is explained in greater detail hereinbelow, this would result in an unfavorable liquor pH change if these liquors were to be applied to the formulation of the hereindescribed adhesives.

The sulfite spent liquors may be employed substantially in the form in which they are obtained from the liquor concentrating operation of the mill, without being first desugared.

As thus obtained, the spent liquors generally have a solids content of from 40 to 55% by weight, usually 50%±2%; a viscosity of, for example, from 500 to 4000 centipoises at 25° C. and 50% concentration, and a pH of from 3.5 to 4.5.

If the solids content is less than about 40% by weight, the spent liquor contains too much water to be conveniently applicable to the manufacture of the adhesive products. If the liquor contains more than 55% solids, it is too viscous to handle conveniently in the plant.

The viscosity of the spent liquor preferably should be within a working viscosity range in which the liquor is pumpable at room temperature and readily mixable with the urea formaldehyde resin. Higher viscosities can be handled by warming the liquor. This permits the use of liquor having viscosities as high as 15,000 centipoises.

The liquor pH should be within the range of 3 to 9.

If the pH of the liquor is below 3, the adhesive in which it is contained cures too fast and gels too rapidly at room temperature for convenient handling. If the pH of the spent liquor is above about 9, the adhesive product of which it is a component cures too slowly to be practical.

The spent liquor preferably should be substantially free of dissolved sulfur dioxide (sulfite ion) since the presence of this material has the end result of raising the pH of the adhesive to a level at which the hot press cure is too slow, adversely affecting the production and properties of wood products made with the adhesive. The spent liquors, if not neutralized, become $SO_2$ free, because that material is driven off during the concentration of the liquor.

As discussed hereinabove, a key component of the adhesive product of the invention, and the one responsible for the successful combination of a large proportion of sulfite spent liquor with urea formaldehyde resin, is ammonium ion used in the amount of 0.2 to 4.0% by weight (expressed as $NH_3$) by weight on spent liquor solids. This component of the mixture has the above described function of reacting with a portion of the formaldehyde to form the relatively inactive product hexamethylene tetramine. This results in the reduction of the pH of adhesive mixture to a level at which it cures rapidly in the hot press.

If too much ammonium ion is present, the resultant high ammonia content of the adhesive reacts quickly with free or loosely combined formaldehyde in the urea formaldehyde resin to produce the stable hexamethylene tetramine, and releases large quantities of strong acids. These excessive quantities of acid in turn lower the pH of the mixture and catalyze the urea formaldehyde resin to a very rapid cure.

The effect of rapid-curing binder on particle board performance is to cause soft surfaces and a general lowering of strength properties through premature cure. Water adsorption and thickness swell are also adversely affected. The pot life of the binder is severely reduced, introducing a serious risk of gelation in plant piping and equipment.

The ammonium ion component of the mixture is included as the water soluble ammonium salt of a strong mineral or organic acid (ionization constant ($K_a$) of $10^{-3}$ or greater). Exemplary of such salts are:

Ammonium lignin sulfonate
Ammonium chloride
Ammonium sulfate
Mono-ammonium phosphate
Ammonium oxalate
Ammonium benzene sulfonate
Ammonium mono-chloracetic acetate It will be apparent that where the acid sulfite liquor comprises an ammonium base acid sulfite spent liquor, the ammonium salt is inherently contained in the spent liquor component of the adhesive product as ammonium lignin sulfonate. It is not necessary in this instance to add additional or extraneous ammonium salt.

In fact, since the ammonium ion content of the liquor usually exceeds that permitted in the hereindescribed adhesive products, the excess ammonium ion may be removed by treating with the predetermined amount of caustic soda or other strong base driving off ammonia and leaving only the desired content of ammonium ion as a residuum. However the removal of excess ammonia with caustic should be done after the removal of sulfur dioxide (on the acid side) as set forth hereinabove.

If calcium, magnesium or sodium base spent liquors are employed, then a sufficient amount of ammonium salt is added to result in the formation of an adhesive product containing ammonium ion in the indicated proportion.

In formulating the adhesive products of the invention from the above primary components, these components in predetermined proportions are simply mixed in suitable and conventional mixing equipment until a uniform mixture is obtained. The mixing is carried out at or near room temperature (10° to 30° C.) in order to inhibit condensation of the components of the sulfite spent liquor with the urea formaldehyde resin. The adhesive product of the invention is substantially uncondensed.

The condensation of the adhesive takes place in the hot press during its cure.

Desired amounts of desired additives may be included in the adhesive mix. Such additives may include for example suitable or conventional proportions of waxes, oils, fungicides, fireproofing agents, surface active agents and dyes, in which case the lignin sulfonate salts serve as dispersing agents for the waxes and oils.

The finished adhesive is stable for a reasonable length of time and may be stored and used in conventional manner.

If it is to be applied to the manufacture of wood particle board, it is sprayed on wood chips, flakes, fibers, shavings or other wood particles and the resultant adhesive-coated particles dry felted into a mat of the desired dimensions, using an adhesive application of the order of 5 to 10% by weight, oven dried wood basis. The mats may be pressed in conventional presses to the desired density under the desired press conditions of, for example 250 to 500 psi at 140° to 160° C. for 2.5 to 10 minutes, depending on board thickness.

As is shown in the following examples, the resulting particle board products, have properties which are commercially acceptable and fully competitive with the properties of particle board products made with conventional urea formaldehyde resin adhesives. The adhesives of the invention, moreover, have the significant economic advantage of including a large proportion of low cost sulfite spent liquor, which results in significant glue cost savings to the mill in which they are employed.

EXAMPLES

The adhesives of the invention and the manner of their preparation and use are illustrated in the following examples, wherein the resinous adhesive products of the invention are identified as "Edler", and the following abbreviations are used:

SSL—spent sulfite liquor
MOR—modulus of rupture
MOE—modulus of elasticity
IB—internal bond The particle board products incorporating the Edler adhesives were tested by ASTM test methods designated ASTM D1037-72.

EXAMPLE 1

This example illustrates the commercial plant application of the resinous adhesives of the invention to the manufacture of industrial grade wood particle board having thickness of ⅜", ½" and ¾".

Four area formaldehyde resins were provided for use in this and the following examples. They had properties as set forth in Table I.

TABLE I

|  | Resin A | Resin B | Resin C (Control) | Resin D (Control) |
|---|---|---|---|---|
| Witte Number (methylol functionality) | 1.58 | 1.67 | 1.02 | 1.02 |
| Mol Ratio (mols formaldehyde/mol urea) | 1.60 | 1.50 | 1.35 | 1.15 |

TABLE I-continued

|  | Resin A | Resin B | Resin C (Control) | Resin D (Control) |
|---|---|---|---|---|
| Solids (% by weight) | 57 | 58 | 65 | 65.5 |
| Viscosity at 25° C. (cps) | 70 | 70 | 300 | 140 |
| pH | 7.4 | 7.4 | — | 7.4 |
| Dilutibility | Infinite | Infinite | Infinite | Infinite |

Resins "A" and "B" were used in the formulation of the hereindescribed "Edler No. 1" and Edler No. 2" adhesives, respectively. Resins "C" and "D" were used as control adhesives.

The sulfite spent liquor employed in the formulation of the Edler adhesive of this example was derived from a concentrated commercial ammonium base acid sulfite spent liquor (SO₂ free) which contained an excess of ammonium ion for the purpose of the present invention. Its ammonium ion content was adjusted to within invention limits by reacting it with a measured amount of sodium hydroxide (caustic soda). After adjustment, the spent liquor contained 1.0% by weight of ammonium ion (expressed as ammonia), dry solids basis.

Its other properties were as follows:
Viscosity at 25° C. (cps): 15,000
pH: 7.35
Solids content (% by weight): 52.0

In a plant run Edler type particle board adhesives were manufactured by mixing together at ambient temperatures urea formaldehyde resin and sulfite spent liquor using the latter in amount sufficient to provide 33% by weight liquor solids, dry solids basis, in the finished adhesives. These adhesives are termed herein "Edler No. 1" and "Edler No. 2".

The mixing was carried out until the components were thoroughly mixed and a uniform blend obtained. During the mixing, no temperature rise or indication of condensation of the mixed constituents was observed.

The adhesives prepared in the foregoing manner were sprayed on wood chips to formulate core and face chip blends. These then were dry felted into a mat which was hot pressed to form the consolidated particle board product. The forming and pressing conditions were as follows:

Furnish: Core and face chip blends, about 67% pine and 33% fir.
Formation: Bahre-Bison air layered board, ½" thick.
Wax Content: 1%
Adhesive Content: Face, 8.3%; Core, 8.3%.
Mat M.C.: Face 10%, Core 8%.
Prepress Cycle: 30 seconds.
Press Time: 2 minutes, 52 seconds.
Time to Stops: 45 seconds.
Decompression Cycle: 30 seconds (in addition to press times).
Press Temperature: 320° F.

Number of boards were made using both adhesive types, the resin "C" serving as a control. The boards were subjected to the above noted ASTM tests D1037-72 for measuring their properties, with results as given in Table II.

TABLE II

| Adhesive Designation | Resin Type | Percent SSL | Density lb./cu. ft. | MOR (psi) | MOE (1000 psi) | Internal Bond (psi) | % Water Absorption | Thickness Swell (in.) |
|---|---|---|---|---|---|---|---|---|
| Control Sample | Resin |  |  |  |  |  |  |  |

TABLE II-continued

| Adhesive Designation | Resin Type | Percent SSL | Density lb./cu. ft. | MOR (psi) | MOE (1000 psi) | Internal Bond (psi) | % Water Absorption | Thickness Swell (in.) |
|---|---|---|---|---|---|---|---|---|
| Averages Edler No. 1 | C | 0 | 46.5 | 2517 | 380 | 144 | 23.0 | 0.033 |
| Sample Averages | Resin A | 33 | 47.8 | 2445 | 392 | 141 | 18.9 | 0.031 |

The foregoing procedure was repeated in the manufacture of wood particle boards having thicknesses of ⅜" and ¾", respectively.

Several test samples of the resulting particle boards were subjected to the conventional ASTM tests with averaged test results as follows:

TABLE III

| Adhesive Designation | Resin Type | % SSL | Panel Thickness (in.) | Density lb./cu.ft.) | MOR (psi) | MOE (1000 psi) | Internal Bond (psi) | Water Adsorption (%) | Thickness Swell (in.) |
|---|---|---|---|---|---|---|---|---|---|
| Control Sample Averages Edler No. 2 | Resin C | 0 | ⅜ | 47.4 | 2790 | 417 | 143 | 29.7 | 0.033 |
| Sample Averages | Resin B | 33 | ⅜ | 49.2 | 2690 | 440 | 116 | 24.6 | 0.031 |
| Control Sample Averages Edler No. 2 | Resin C | 0 | ¾ | 47.3 | 2920 | 464 | 141 | 22.9 | 0.036 |
| Sample Averages | Resin B | 33 | ¾ | 46.9 | 2470 | 447 | 107 | 18.9 | 0.030 |

The urea formaldehyde resin designated resin "C" in Table I again was used as a control.

Edler No. 2 adhesive was prepared by mixing sulfite spent liquor with resin "B" (Table I) in amount sufficient to provide 33% by weight spent liquor solids, dry adhesive basis. Like the sulfite spent liquor employed in the manufacture of the above described one-half inch particle board, the spent liquor employed in the production of the ⅜" and ¾" particle boards presently under consideration comprised a commercial concentrated ammonium base acid sulfite spent and SO₂ free liquor originally containing excess ammonium ion, but adjusted by reaction with sodium hydroxide in amount predetermined to fix the final ammonium ion value at 0.4% by weight (expressed as ammonia) on a total spent liquor solids basis.

The other properties of the adjusted sulfite spent liquor were as follows: The
Viscosity at 25° C. (cps): 1200
pH: 6.95
Solids (% by weight): 50.2

Both the control resinous adhesive and the resinous adhesive of the invention were sprayed onto wood particles which were then dry formed into a mat and the mat hot pressed, all under the following forming and pressing conditions:
Furnish: Core and face chip blends, about 67% pine and 33% fir.
Formation: Bahre-Bison air-layered boards, thicknesses as shown.
Wax Content: 1%
Adhesive Content: Face 8%, Core 8%
Mat M.C.: Edler 10%; Control 9.6%
Prepress Cycle: 30 seconds
Press Time: ¾", 4½ minutes; ⅜", 2½ minutes
Time to Stops: ¾", 65 seconds; ⅜", 35 seconds
Decompression Cycle: ¾", 40 seconds; ⅜", 20 seconds (in addition to press times)
Press Temperature: ¾", 320° F., ⅜", 310° F.

The above tests demonstrate clearly that the adhesives of the invention containing ⅓ by weight sulfite spent liquor may be used in the production of wood particle boards of commercially acceptable properties, which compare favorably with the properties of the control boards made with straight commercial urea formaldehyde resin adhesives. This indicates that the rheological and curing properties of the adhesives of the invention are fully compatible with normal particle board manufacturing procedures and may be utilized without requiring process changes or causing reductions in plant capacity.

In these respects, the performance of the spent liquor-containing adhesives of the invention compares favorably with the performance of straight commercial urea-formaldehyde resin adhesives which have been carefully adjusted over several years of operation to the particular requirements of particle board manufacturing techniques. In fact, particle boards made using the adhesives of the invention demonstrate significantly improved water resistance qualities over those made with commercial resins of the same class.

By way of contrast, failure to duplicate each performance has been observed in the past when testing other resin-sulfite spent liquor compositions. These tests not only produced particle board of inferior physical properties, but, because of unfavorable rheological properties of the adhesive, caused immediate plant shutdown due to inability to form and handle a proper mat.

EXAMPLE 2

This example illustrates the preparation of the adhesive products of the invention containing from 10–50% of sulfite spent liquor, and the properties of such products.

In a laboratory study, a series of urea formaldehyde resin-sulfite spent liquor adhesives was prepared using the procedure outlined in Example 1. The adhesives contained respectively 10%, 30% and 50% by weight, dry solids basis, of sulfite spent liquor. The adhesives were applied to wood chips which then were laid up into mats and hot pressed into particle boards, the properties of which were tested. The properties of the experimental boards then were compared with those of control boards made similarly, but containing no sulfite spent liquor.

The commercial resinous urea formaldehyde particle board adhesives used as controls had the properties set forth in Table I of Example I under the headings "Resin C" and "Resin D", respectively.

The urea formaldehyde resin component of the test adhesive of this example had the properties listed in the columns headed "Resin A" and "Resin D" of Table I of Example 1.

The sulfite spent liquor component of the test adhesive comprised a substantially sulfur dioxide free, concentrated sodium base acid sulfite spent liquor to which sufficient ammonium sulfate had been added to produce a resultant spent liquor product containing 0.425% by weight ammonium ion, expressed as ammonia based on spent liquor solids.

The other properties of the spent liquor were as follows:
Viscosity at 25° C. (cps): 830
Solids Content (% by weight): 50
pH: 6.8

The forming and pressing conditions employed in the manufacture of the board products were as follows:
Furnish: Douglas Fir Chips
Formation: Air Felted
Adhesive Content: 7% total solids
Mat Moisture Content: 9.5%
Press Time: 4 minutes, 4½ minutes, 5 minutes 4½ minutes average
Press Temperature: 325° F.
Board Thickness: ⅜"
Board Density: 0.73±0.15

Upon being tested, the particle board products demonstrated the following properties:

| Spent Liquor Solids | Control Adhesive | Edler Adhesives | | |
|---|---|---|---|---|
| Resin Component | 0% | 10% | 30% | 50% |
| Resin A | | | | |
| MOR | 3022 | 3080 | 3150 | 2900 |
| IB | 113 | 110 | 100 | 67 |
| Resin D | | | | |
| MOR | 3140 | 3220 | 3060 | 2430 |
| IB | 113 | 118 | 112 | 55 |

It is to be noted that the Edler adhesive compositions containing up to 50% sulfite spent liquor solids had commercially acceptable properties for some purposes. Also it is notable that resins with Witte numbers in the range of 1.0 to 1.8 give good Edler adhesives.

EXAMPLE 3

This example illustrates the effect on particle board properties of incorporating in the adhesive products of the invention more than the stipulated amount of ammonium ion, i.e. more than 4.0% by weight ammonium ion (expressed as $NH_3$) dry solids basis, based on spent liquor solids.

Urea formaldehyde resin, commercial high ammonium content sulfite spent liquor, and 1% by weight wax were thoroughly mixed and blended at ambient temperature, using sufficient of the sulfite spent liquor to provide 33% sulfite spent liquor solids in the resulting adhesive product, dry weight basis. The ammonium base sulfite spent liquor contained 5.7% by weight ammonium ion (expressed as ammonia) dry spent liquor solids basis. Its other properties and the properties of the test resin, designated "Resin E", as well as those of a commercial urea formaldehyde resin used as a control and designated "Resin F" are given in Table IV below.

TABLE IV

| Property | Resin E | Resin F (Control) | Sulfite Waste Liquor |
|---|---|---|---|
| Mol Ratio | 1:1.8 | 1:1.3 | — |
| Solids (% by weight) | 65 | 65 | 52 |
| Viscosity at 21° C. (cps) | 400 | 295 | 3000 |
| pH | 7.4 | 7.5 | 7.2 |
| Witte Number | 1.72 | 1.02 | — |
| Water Solubility | Infinite | Infinite | — |
| Ammonia Content (% by weight) | — | — | 5.7% |

Resin E was used in the manufacture of "Edler adhesive No. 3". Resin F was used as a control.

Two sets of ⅜" wood particle boards were manufactured with the above two adhesive products, using the following forming and pressing conditions:
Furnish: Core and face chip blends, about 67% pine and 33% fir.
Formation: Bahre-Bison air-layered boards at thickness shown.
Wax Content: 1%
Adhesive Content: Face 8.3%, Core 8.3%
Adhesive pH: Control 7.8, Edler 4.4
Mat M.C.: Control 8.5%; Edler 9.5%
Prepress Cycle: 30 seconds
Press Time: 2¾ minutes
Time to Stops: 45 seconds
Decompression Cycle: 40 seconds (in addition to press time)
Press Temperature: 310° F.

Testing the board products gave the values set forth in table V below:

TABLE V

| Adhesive Designation | Resin Type | SSL % | Panel Thickness (in.) | Density lb./cu.ft. | Precure (in.) | MOR (psi) | MOE (1000 psi) | Internal Bond (psi) | Water Adsorption (%) | Thickness Swell (in.) |
|---|---|---|---|---|---|---|---|---|---|---|
| Control | Resin F | 0 | ⅜ | 46.6 | 0 | 2700 | 400 | 96 | 26.8 | 0.028 |
| Edler No. 3 | Resin E | 33 | ⅜ | 46.2 | 0.031 | 1405 | 269 | 40 | 33.7 | 0.041 |

Table V clearly shows the undesirable effect on board performance properties generally of including high levels of ammonia in the sulfite spent liquor. Both strength values and properties of water resistance are sharply reduced. The high ammonia content, rapid-curing binder causes soft board surfaces and general lowering of strength properties through premature cure. Also, the working life of the binder is greatly reduced, introducing a serious risk of gelation in plant piping and equipment.

EXAMPLE 4

This example illustrates the application of various categories of $SO_2$ free sulfite spent liquors to the manufacture of the hereindescribed adhesive products. The spent liquors tested were:

A concentrated commercial sodium base acid sulfite spent liquor to which sufficient ammonium sulfate had been added to provide an ammonium ion content (expressed as $NH_3$) of 0.4%, spent liquor solids basis.

A concentrated commercial calcium base spent liquor which had been desugared and contained an ammonium ion content (expressed as $NH_3$) of 0.34% by weight, dry solids basis.

A concentrated high-ammonia, ammonium base, commercial sulfite spent liquor which had been partially reacted with caustic soda to a residual ammonium ion content (expressed as $NH_3$) of 0.46% dry solids basis. The properties of these sulfite spent liquors are given in Table VI. The pH of each was adjusted to about 7.0 before incorporating it into the adhesive.

TABLE VI

| Sulfite Spent Liquor | Viscosity 25° C. (cps) | Ammonia % by weight | Solids % by weight | pH 25° C. |
|---|---|---|---|---|
| Ammonium sulfate modified sodium base | 300 | 0.4 | 50.3 | 4.80 |
| Desugared calcium base | 1066 | 0.34 | 51.9 | 3.79 |
| Caustic soda treated ammonium base | 740 | 0.46 | 48.7 | 7.12 |

A commercial straight urea formaldehyde particle board adhesive was used as a control and designated "Resin D" (Table I).

The urea formaldehyde resin employed in the formulation of the test adhesives was "Resin B" and had the physical properties set forth in Table I of Example 1.

The adhesives were formulated as set forth in the preceding examples. They were sprayed onto wood particles which then were laid up into mats and hot pressed under the following forming and pressing conditions.

Furnish: Douglas Fir Wood Particles
Formation: Dry Felted
Wax Content: 0%
Adhesive Content: 7%
Mat Moisture Content: 9%
Board Thickness: ¾"
Press Time: 2 boards, 4.5 minutes; 2 boards, 5 minutes
Time to Stops: 70 seconds The resulting particle boards were tested under ASTM test method D-1037-72 with results given in Table VII, the results being averages of tests carried out on four specimens from each board.

TABLE VII

| Adhesive Designation | Adhesive Characterized by Content of: | Resin Type | MOR | Internal Bond |
|---|---|---|---|---|
| Edler No. 4 | Ammonium sulfate modified sodium base | B | 2775 | 95 |
| Edler No. 5 | Desugared calcium base | B | 2740 | 91 |
| Edler No. 6 | Caustic soda treated ammonium base | B | 2845 | 97 |
| Control | none | D | 2945 | 112 |

The strength values of the test boards thus are substantially the full equivalent of those of the control board and are well within commercially acceptable limits.

EXAMPLE 5

This example illustrates the application of a magnesium base acid sulfite spent liquor in the formulation of the adhesive products of the invention.

The urea formaldehyde resin used in the formulation of the adhesive was that identified as "Resin B" in Table I, supra. It had a solids content of 58% by weight, a Witte number of 1.67, and a mol ratio of 1.50.

The sulfite spent liquor employed was a commercial magnesium base acid sulfite spent liquor containing 47% solids.

The control was a commercial particle board urea formaldehyde resin having a mol ratio of 1.25, which contained no sulfite spent liquor (Resin G).

The 67/33 (resin to spent liquor solids) core and face adhesive products (Edler No. 7 and 7a) were prepared by mixing the urea formaldehyde resin and sulfite spent liquor, together with ammonium sulfate as the source of ammonium ion, in the following proportions:

| | |
|---|---|
| Board core layer: | 320.7g Resin B; 58.5% solids, pH 7.0 198.6g magnesium base acid sulfite spent liquor; 47% solids, pH 4.5 8.5g ammonium sulfate |
| Board face layer: | 329.3g Resin B; 58.5% solids, pH 7.0 203.9g magnesium base acid sulfite spent liquor; 47% solids, pH 4.5 3.0g ammonium sulfate |

The resinous adhesives were sprayed on wood particles using applications of 11.5% in the face and 7% in the core, dry solids basis. The adhesive coated particles then were felted into mats and pressed into 11/16" boards in conventional manner, using a press pressure of 500 psi, a press closing time of 30–40 seconds, a press cycle of 3.5 minutes, and a press temperature of 350° F.

The properties of the resulting panels were tested (ASTM D1037-72) with results as given below, which are averages for five panels allowed to reach equilibrium under ambient conditions for 48 hours prior to testing:

TABLE VIII

| Adhesive Designation | Resin Tye | Lbs/ft³ Density | psi MOR | psi IB | 2 Hour Thickness Swell | 2 Hour Water Adsorption |
|---|---|---|---|---|---|---|
| Control UF Resin- Magnesium Base SSL (Edler No. 7 | Resin G | 42.6 | 2233 | 87 | 16.1% | 91.6% |

TABLE VIII-continued

| Adhesive Designation | Resin Tye | Lbs/ft³ Density | psi MOR | psi IB | 2 Hour Thickness Swell | 2 Hour Water Adsorption |
|---|---|---|---|---|---|---|
| and 7a) | Resin B | 45.4 | 2654 | 92.8 | 17.6% | 77.2% |

EXAMPLE 6

This example illustrates the application of magnesium based sulfite spent liquors to the adhesive products of the invention, but under somewhat different conditions, in particular using a spent liquor of lower pH than those set forth in Example 5.

Wood particle boards were prepared using the same control resin (Resin G) as used in Example 5 and similar core and face test adhesives (Edler No. 8 and 8a) which, however, contained 50% rather than 47% spent liquor solids in the ratio of 67/33, urea formaldehyde resin to sulfite spent liquor solids, dry weight basis. The adhesive formulations employed in the core and face layers of the board were as follows:

| Core layer | 320.7g Resin B |
| | (Table I) urea formaldehyde resin 58% solids, pH 7.0 |
| | 186.7g magnesium base acid sulfite spent liquor, 50% solids, pH 3.2 |
| | 2.5g ammonium sulfate |
| Face layer | 329³g Resin B urea formaldehyde resin 58% solids, pH 7 |
| | 191.7g magnesium base acid sulfite spent liquor 50% solids, pH 3.2 |
| | 2.8g ammonium sulfate |

In the manufacture of the particle boards, the same amount of adhesive, the same manufacturing procedure, the same control resin and the same board thickness were used as are set forth in Example 5. The press cycle was three minutes and twelve seconds at 350° F. The test results (five panel average) were as follows:

TABLE IX

| Adhesive Designation | resin Type | Lbs/ft³ Density | psi MOR | psi IB | 2 Hour Thickness Swell | 2 Hour Water Adsorption |
|---|---|---|---|---|---|---|
| Control UF Resin-Magnesium Base SSL (Edler No. 8 and 8a) | Resin G | 42.6 | 2233 | 87 | 16.1% | 91.6% |
| | Resin B | 44.6 | 2494 | 91.4 | 16.3% | 84.5% |

In a manner similar to the foregoing, urea formaldehyde-sulfite spent liquor adhesives are made and wood particle boards and other glued wood products are manufactured therefrom using as a source of ammonium ion, in place of ammonium sulfate: ammonium chloride, mono-ammonium phosphate, ammonium oxalate, ammonium benzene sulphonate and ammonium monochloracetic acetate.

EXAMPLE 7

This example illustrates the effect of incorporating in the adhesive products of the invention a low mol ratio, low Witte number urea formaldehyde resin.

A urea formaldehyde resin-sulfite spent liquor adhesive was prepared using the procedure outline in Example 1. The urea formaldehyde resin component of the test adhesive had the following properties:

| Witte number | 0.76 |
| Mol Ratio (mols formaldehyde) (mols urea) | .90 |
| Solids (% by weight) | 65 |
| Viscosity at 25° C. (cps) | 70 |
| pH | 7.3 |
| Dilutibility | Infinite |

The sulfite spent liquor component of the test adhesive had the properties of the sulfite spent liquor described in Example 2.

The forming and pressing conditions employed in the manufacture of the board product were as described in Example 2.

Upon being tested, the particle board products demonstrated the following properties:

| MOR | 1381 |
| IB | 22 |

This example clearly shows the undesirable effect of using low mol ratio, low Witte number urea formaldehyde resin. Both the MOR and IB are well below the minimum National Particle Association standards for wood particle board products (MOR-1600; IB-60).

Having thus described my invention in preferred embodiments, I claim:

1. An adhesive product comprising in substantially uncondensed admixture with each other, and in parts by weight, dry solids basis:

Urea-Formaldehyde Resin: 50-90
Spent Liquor from the Acid Sulfite Pulping of Lignocellulose: 10-50
  the adhesive product containing from 0.2 to 4.0% by weight ammonium ion (expressed as NH₃) on a spent liquor solids basis,
  the spent liquor component of the mixture prior to mixing having a pH of from 3-9,
  the urea formaldehyde resin component of the mixture prior to mixing being characterized by a molar ratio of formaldehyde to urea of from 1.0–1.8 to 1; a pH of from 6–8; and a methylol content corresponding to a Witte number of from 1.0 to 1.8.

2. The adhesive product of claim 1 wherein the spent liquor comprises at least one member of the group consisting of the calcium base, magnesium base, sodium base and ammonium base spent liquors.

3. The adhesive product of claim 2 wherein the spent liquor comprises ammonium base acid sulfite spent liquor.

4. The adhesive product of claim 2 wherein the spent liquor comprises calcium base acid sulfite spent liquor.

5. The adhesive product of claim 2 wherein the spent liquor comprises magnesium base acid sulfite spent liquor.

6. The adhesive product of claim 2 wherein the spent liquor comprises sodium base acid sulfite spent liquor.

7. The adhesive product of claim 1 wherein the spent liquor comprises a calcium base acid sulfite spent liquor and a sufficient amount of a water soluble ammonium salt of a strong acid to provide from 0.2 to 4.0% by weight of ammonium ion (expressed as $NH_3$) based on the spent liquor solids in the final adhesive product.

8. The adhesive product of claim 7 wherein the ammonium salt comprises ammonium chloride.

9. The adhesive product of claim 7 wherein the ammonium salt comprises ammonium sulfate.

10. The adhesive product of claim 1 wherein the spent liquor comprises a magnesium base acid sulfite spent liquor and a sufficient amount of a water soluble ammonium salt of a strong acid to provide from 0.2 to 4.0% by weight of ammonium ion (expressed as $NH_3$) based on the spent liquor solids in the adhesive product.

11. The adhesive product of claim 10 wherein the ammonium salt comprises ammonium chloride.

12. The adhesive product of claim 10 wherein the ammonium salt comprises ammonium sulfate.

13. The adhesive product of claim 1 wherein the spent liquor comprises a sodium base acid sulfite spent liquor and a sufficient amount of a water soluble ammonium salt of a strong acid to provide from 0.2 to 4.0% by weight of ammonium ion (expressed as $NH_3$) based on the spent liquor solids in the adhesive product.

14. The adhesive product of claim 13 wherein the ammonium salt comprises ammonium chloride.

15. The adhesive product of claim 13 wherein the ammonium salt comprises ammonium sulfate.

16. The adhesive product of claim 1 wherein the spent liquor has a pH of from 5-7 has a solids content of from 40-55% by weight, and wherein the urea formaldehyde resins has a solids content of from 50-72% by weight.

17. The method of making an adhesive product comprising combining, in substantially uncondensed admixture, spent acid sulfite pulping liquor and urea formaldehyde resin in the following proportions, expressed in parts by weight, dry solids basis:
Urea-Formaldehyde Resin: 50-90
Spent Liquor from the Acid Sulfite Pulping of Lignocellulose: 10-50
   the adhesive product containing from 0.2 to 4.0% by weight of ammonium ion (expressed as $NH_3$) on a spent liquor solids basis,
   the spent liquor component of the mixture prior to mixing having a pH of from 3 to 9,
   the urea formaldehyde resin component of the mixture prior to mixing being characterized by a molar ratio of formaldehyde to urea of from 1.0–1.8 to 1;
   a pH of from 6–8, and a methylol content corresponding to a Witte number of from 1.0 to 1.8.

18. The method of making glued wood products which comprises applying to the surfaces of pieces of wood of bonding quantity of adhesive comprising in substantially uncondensed admixture with each other, and in parts by weight, dry solids basis:
Urea-Formaldehyde Resin: 50-90
Spent Liquor from the Acid Sulfite Pulping of Lignocellulose: 10-50
   the adhesive containing from 0.2 to 4.0 % by weight ammonium ion (expressed as $NH_3$) on a spent liquor solids basis,
   the sulfite liquor component of the mixture prior to mixing having a pH of from 3–9,
   the urea formaldehyde resin component of the mixture prior to mixing being characterized by a molar ratio of formaldehyde to urea of from 1.0–1.8 to 1;
   a pH of from 6–8; and a methylol content corresponding to a Witte number of from 1.0 to 1.8 assembling and hot pressing the resulting adhesive-coated pieces of wood to form the glued wood product.

19. The method of claim 18 wherein the pieces of wood comprise wood particles.

20. The particle board produced by the process of claim 19.

* * * * *